United States Patent Office 3,637,853
Patented Jan. 25, 1972

3,637,853
O,O'-BIS(γ-DIMETHYLAMINO-PROPYL)-DIISO-
EUGENOL AND SALTS THEREOF
Jenö Körösi, István Pataky, and Tibor Láng, Budapest,
Hungary, assignors to Egyesult Gyogyszer—es Taps-
zergyar, Budapest, Hungary
No Drawing. Filed Nov. 20, 1967, Ser. No. 684,504
Claims priority, application Hungary, Nov. 26, 1966,
EE–1,312
Int. Cl. C07c 93/06
U.S. Cl. 260—570.7    1 Claim

ABSTRACT OF THE DISCLOSURE

New compounds of hypertensive and spasmolytic activity having the formula

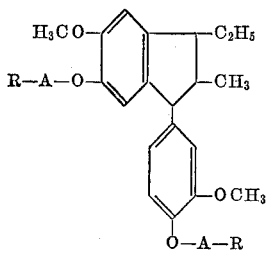

wherein R is a dimethylamino, diethylamino, piperidino, morpholino or N'-benzoyl-piperazino groups, and A is a straight or branched chain alkylene group having from 2 to 4 carbon atoms, and the dihydrochloric, maleic and tartaric acid salts thereof.

This invention relates to new diisoeugenol derivatives of pharmacological value. More particularly, it is concerned with new O,O'-disubstituted diisoeugenol derivatives having the general Formula I

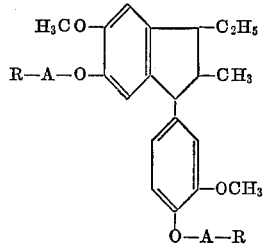

and their acid addition salts and quaternary ammonium derivatives. In the general Formula I, R stands for lower dialkylamino, piperidino, morpholino and N'-substituted piperazino radicals, and A is a straight or branched chain alkylene radical having from 2 to 4 carbon atoms.

The invention includes all the stereoisomers and stereoisomeric mixtures of the compounds having the general Formula I, not only in free base form but also their acid addition salts and quaternary ammonium derivatives as well as their enantiomers and diastereoisomers.

The new compounds having the general Formula I can be conveniently prepared by reacting diisoeugenol with a compound having the general Formula II

R—A—X    (II)

wherein R and A have the same meanings as above, and X stands for halogen, in the presence of an acid-binding agent, preferably an alkali hydroxide or carbonate, and if desired, the obtained compound is transformed in a known way to an acid addition salt or a quaternary derivative.

This reaction can be carried out in a solvent, preferably a lower alkanol or a mixture of water and a lower alkanol. The reaction temperature is preferably between 20° C. and 100° C.

As indicated above, the new compounds according to the invention possess basic properties and form acid addition salts and quaternary ammonium derivatives.

If it is desirable to obtain the acid addition salt from the free base, the salt can be prepared by reacting the free base with a corresponding inorganic or organic acid, such as hydrochloric, hydrobromic, sulphuric, phosphoric, tartaric, lactic, acetic, p-toluene-sulphonic, mandelic, salicylic, citric and other pharmaceutically acceptable acids, preferably in the presence of a suitable solvent permitting isolation of the salt. Due to the presence of two basic nitrogen atoms, the acid addition salts can be formed with one or two equivalents of the acid.

The quaternary derivatives can be prepared by reacting the free base with a halogen alkyl compound, preferably in the presence of an indifferent solvent.

On the other hand, when it is desired to convert the acid addition salt or the quaternary derivative to the free base, this can be accomplished by dissolving the salt in a suitable solvent, neutralizing the solution with a basic material, such as sodium hydroxide and the like, and isolating the desired base by extraction or other suitable means.

The compounds of the general Formula I as well as their acid addition salts and quaternary ammonium derivatives can be transformed to pharmaceutically suitable products by adjusting them alone or combined with other biologically active compounds, if desired, together with carrier, binding, filling, surface-active, flavouring etc. agents usable in the pharmaceutical industry, in a known way, to medicines.

The new compounds according to the invention possess valuable pharmacological properties. They show a spontaneous hypertensive and spasmolytic effect. Thus e.g. the O,O' - bis(γ - dimethylamino-propyl)-diisoeugenol-dichlorohydrate exerts on rats and guinea pigs a spasmolytic effect which is 40% stronger than that of papaverine (1 - [3,4 - dimethoxybenzyl]-6,7-dimethoxy-isochinoline-chlorohydrate) and, in contradistinction to the papaverine, it does not deteriorate the blood circulation. When investigating the effect on the sinus-pressor reflex of the carotis, it has been found that, within certain dosis-limits, the pressor response increased.

The new compounds according to the invention and their method of preparation are further illustrated by the aid of the following examples.

EXAMPLE 1

A mixture of 16.4 g. (0.05 mole) of diisoeugenol, 28.3 g. (0.205 mole) of K₂CO₃ dissolved in 50 ml. of water, 18 g. (0.104 mole) of β-diethylamino-ethyl-chloride-chlorohydrate and 300 ml. of isopropanol is evaporated within 2 hours on a water bath through a cooler mounted for distillation. The residue is shaken out with a mixture of 150 ml. of benzene and 50 ml. of water, whereafter the phase containing benzene is shaken out with a mixture of 75 ml. of water and 10 ml. of glacial acetic acid. In this way the base is transferred into the aqueous phase. The phase containing benzene is getting light. From the aqueous phase the raw O,O'-bis(β-diethylamino-ethyl)-diisoeugenol base is precipitated and transferred by shaking into 100 ml. of benzene. The solution containing benzene is dehydrated with 10 g. of anhydrous sodium sulphate. Then ethanol saturated with 10 ml. of gaseous hydrogen chloride is added whereupon the hydrochloric salt separates as an oil. After distilling off the benzene, the raw hydrochloric salt is solidified as very hygroscopic crystals. M.P.: 160–165° C.

After treating with isopropanol, filtering and drying in a vacuum exsiccator containing KOH, a very hygroscopic microcrystalline product is obtained. Weight: 27.3 g. M.P. (in a sealed capillary tube): 168–170° C.

Analysis data for $C_{32}H_{52}Cl_2N_2O_4$ (599.67).—Calculated, (percent): N, 4.67. Found, (percent): N, 4.52.

EXAMPLE 2

328 g. (1 mole) of diisoeugenol and 115 g. (2.05 moles) of potassium hydroxide are dissolved in 2000 ml. of absolute ethanol while boiling, whereafter 250 g. (2.05 moles) of freshly distilled γ-dimethylamino propyl-chloride are dropped to within 3 hours, while boiling and stirring. After boiling for further 30 minutes the solution is cooled, the KCl precipitated (128 g.) is filtered and the KCl precipitate is washed with 2× 50 ml. of abs. ethanol. The ethanolic solution is evaporated under vacuum. The residue (526 g.) is a brown oil containing about 25 g. of KCl. After cooling, the KCl crystallizes out. The crude O,O' - bis(γ - dimethylamine-propyl)-diisoeugenol base is dissolved in 1500 ml. of benzene, filtered and again evaporated. In this way 496 g. of purified base are obtained. M.P. (after digesting with petrolether): 111–113° C.

Analysis data for $C_{30}H_{46}N_2O_4$ (498.68).—Calculated, (percent): N, 5.62. Found, (percent): N, 5.88.

83 g. of the base are dissolved in 640 ml. of methanol, whereafter methanol containing hydrogen chloride are added until a pH value of 4 is reached. Thereafter the solution is evaporated and the residue is crystallized from 12 volumes of isopropanol. The crystals are powderlike, very fine, hygroscopic, white; they can be difficultly filtered and readily dissolved in water at a pH value of 6. Weight: 65 g. M.P.: 214.5–216° C.

Analysis data for $C_{30}H_{48}Cl_2N_2O_4$ (571.60).—Calculated, (percent): N, 4.90; Cl, 12.40. Found, (percent): N, 4.59, 4.96; Cl, 12.55, 12.38.

In the same way the following salts have been prepared:

| | M.P., ° C. |
|---|---|
| Maleinate | 158–160 |
| Tartarate | 178–181 |

The M.P. values relate to products recrystallized from a mixture of ethanol and acetone.

EXAMPLE 3

10.85 g. (0.033 mole) of diisoeugenol, 2.87 g. (0.0715 mole) of NaOH and 100 ml. of methanol are refluxed for 1 hour, whereafter during further 30 minutse 11.5 g. (0.0715 mole) of γ-piperidino-propyl-chloride dissolved in 20 ml. of methanol are dropped to while boiling. After further boiling for 1 hour, the reaction mixture is cooled, filtered and evaporated. The oily residue is taken up with 60 ml. of benzene, filtered and fully evaporated. Thereafter the system is sucked at a temperature of 100° C. so as to attain a vacuum of 5 Hg mm. The brown, oily residue (19 g.) is dissolved in 50 ml. of methanol. Methanol containing hydrogen chloride in a calculated amount is added, whereafter the reaction mixture is evaporated and the raw O,O'-bis(γ-piperidino-propyl)-diisoeugenol.2HCl is recrystallized from isopropanol. Yield: 7.15 g. of white, crystalline powder. M.P.: 212–214° C.

Analysis data for $C_{36}H_{56}Cl_2N_2O_4$ (651.74).—Calculated, (percent): Cl, 10.88. Found, (percent): Cl, 11.50.

From the substance obtained from isopropanol an end product melting at 204–210° C. can be precipitated with ether.

EXAMPLE 4

32.8 g. (0.1 mole) of diisoeugenol, 23.5 g. (0.42 mole) of KOH dissolved in 500 ml. of abs. ethanol and 63.5 g. (0.22 mole) of N-benzoyl-N'-(β-chloroethyl)-piperazine.HCl are fed into a round-bottomed flask having a volume of 1 litre. The reaction mixture is refluxed for 3 hours on a water bath and after cooling it is filtered. The filtrate is evaporated to dryness. The residue is dissolved in 500 ml. of hot benzene, clarified with 5 g. of charcoal and the solution containing benzene is evaporated.

The obtained dark brown substance consists of 73 g. (96.3%) of O,O' - (β - N-benzoyl-piperazino-ethyl)-diisoeugenol having a resinous consistency.

28 g. (0.05 mole) of the crude base are dissolved in 100 ml. of absolute ethanol. The solution is clarified with 2 g. of charcoal and then methanol saturated with dry gaseous hydrogen chloride is added until a pH value of 5 is reached. The hydrochloride salt is precipitated with 200 ml. of ether from the ethanolic solution. The product is filtered, washed with 50 ml. of ether and dried in a vacuum exsiccator containing KOH.

Yield: 21.7 g. M.P.: 175° C. The product is hygroscopic; when precipitated from 100 ml. of absolute ethanol with 200 ml. of absolute ether its melting point raises to 192° C. The pH value of the aqueous solution is 5.5–6.

Analysis data for $C_{46}H_{58}Cl_2N_4C_6$ (833.86).—Calculated, (percent): N, 6.72; Cl, 8.50. Found, (percent): N, 6.37; Cl, 8.79.

What we claim is:

1. O,O'-bis(γ-dimethylamino-propyl)-diisoeugenol and its acid addition salts formed with hydrochloric, maleic, and tartaric acids.

References Cited

UNITED STATES PATENTS 3,121,724   2/1964   Shapiro et al. ___ 260—570.7 X

OTHER REFERENCES

Korosi, et al., "Chemical Abstracts," vol. 69 (1968), col. 86698t.

ALEX MAZEL, Primary Examiner

J. H. TURNIPSEED, Assistant Examiner

U.S. Cl. X.R.

260—246, 268, 294.7; 424—248, 250, 267, 325, 329